(12) United States Patent
Peng

(10) Patent No.: US 11,197,573 B2
(45) Date of Patent: Dec. 14, 2021

(54) LID BODY AND PRESSURE COOKER

(71) Applicant: FOSHAN SHUNDE MIDEA ELECTRICAL HEATING APPLIANCES MANUFACTURING CO., LTD., Foshan (CN)

(72) Inventor: Feng Peng, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 119 days.

(21) Appl. No.: 16/644,801

(22) PCT Filed: Nov. 8, 2017

(86) PCT No.: PCT/CN2017/109823
§ 371 (c)(1),
(2) Date: Mar. 5, 2020

(87) PCT Pub. No.: WO2019/061686
PCT Pub. Date: Apr. 4, 2019

(65) Prior Publication Data
US 2021/0068578 A1    Mar. 11, 2021

(30) Foreign Application Priority Data

Sep. 29, 2017   (CN) .......................... 201710908083.8
Sep. 29, 2017   (CN) .......................... 201721277746.2

(51) Int. Cl.
*A47J 27/092*         (2006.01)
(52) U.S. Cl.
CPC .................................. *A47J 27/092* (2013.01)

(58) Field of Classification Search
CPC ..................................................... A47J 27/092
See application file for complete search history.

(56) References Cited

U.S. PATENT DOCUMENTS

2019/0008316 A1*  1/2019  Kim .................... A47J 27/0813
2019/0069706 A1*  3/2019  Kim .................... A47J 27/0813

FOREIGN PATENT DOCUMENTS

CN           201127508 Y      10/2008
CN           201719050 U       1/2011
(Continued)

OTHER PUBLICATIONS

World Intelllectual Property Organization (WIPO) International Search Report for PCT/CN2017/109823 dated Jun. 27, 2018 6 Pages(Translation Included).

(Continued)

*Primary Examiner* — John J Norton
(74) *Attorney, Agent, or Firm* — Anova Law Group, PLLC

(57) ABSTRACT

A lid body for a pressure cooker includes a pot lid, an inner lid mounted at an outer side of the pot lid, a top lid mounted at an outer side of the inner lid, and a solenoid exhaust valve. The pot lid includes a mounting cavity and a limiting rib protruding inward from a side wall of the mounting cavity. The solenoid exhaust valve includes a valve seat mounted in the mounting cavity and including a mounting hole, a valve core inserted in the mounting hole, and a valve cover matingly connected with a top of the valve core and being movable with respect to the valve core. A bottom end of the valve seat abuts against an upper end face of the limiting rib, and a lower end face of the limiting rib abuts against the pot lid or the inner lid.

16 Claims, 8 Drawing Sheets

(56) References Cited

FOREIGN PATENT DOCUMENTS

| | | | |
|---|---|---|---|
| CN | 103876614 A | 6/2014 | |
| CN | 105310492 A | 2/2016 | |
| CN | 206324641 U | 7/2017 | |
| JP | 2007236404 A | 9/2007 | |
| KR | 19990012914 A * | 2/1999 | ............ A47J 27/086 |
| KR | 200157616 Y1 * | 10/1999 | .......... A47J 27/0802 |
| KR | 100309391 B1 * | 7/2002 | ........... F16K 17/048 |
| KR | 20090019332 A * | 2/2009 | ............ A47J 27/092 |

OTHER PUBLICATIONS

World Intellectual Property Organization (WIPO) Written Opinion for PCT/CN2017/109823 with translation dated Jun. 27, 2018 6 Pages.

\* cited by examiner

LID BODY AND PRESSURE COOKER

CROSS-REFERENCE TO RELATED APPLICATIONS

This application is a National Stage Entry under 35 U.S.C. § 371 of International Application No. PCT/CN2017/109823, filed on Nov. 8, 2017, which claims priority to Chinese Application Nos. 201710908083.8 and 201721277746.2, both filed on Sep. 29, 2017, the entire contents of all of which are incorporated herein by reference.

TECHNICAL FIELD

The present invention relates to the field of cookers, in particular to a lid body and a pressure cooker having the lid body.

BACKGROUND TECHNOLOGY

Existing pressure cookers employ a solenoid exhaust valve for automatic exhaustion. These products change the magnitude and/or direction of the current in the coil in the solenoid valve seat by means of circuit control, so as to change the magnitude or direction of the magnetic field generated by the solenoid valve seat to realize attraction and repulsion to the solenoid valve and thereby control the open or close of the solenoid exhaust valve.

To prevent the fit clearance between the top lid and the pot lid from exceeding standard, such products employ the following structure: an inner lid is arranged between the pot lid and the top lid, the solenoid valve seat is fixed on the inner lid and after which the top lid is snap-fitted, then the exhaust valve core is inserted from the top through the top lid first and through the solenoid valve seat, the inner lid, and the pot lid sequentially, and finally is fixed to the pot lid using nuts, and thereby the purpose of tensioning up the top lid is realized.

With that structure, since the top lid is always tensioned by the exhaust valve core and the contact area between the exhaust valve core and the top lid is small, the fitting surface of the top lid where the exhaust valve core is fitted will deform after long-time operation of the product, resulting in bulging at the circumference of the surface of the top lid in contact with the exhaust valve core. The bulged portion may lift the solenoid valve cover. Consequently, air leakage from the solenoid exhaust valve may occur, and the product cannot operate normally. Apparently, there is large room for improvement of the structures of the existing products.

SUMMARY OF THE INVENTION

The object of the present invention is to solve at least one of the technical problems in the existing technologies.

To that end, one object of the present invention is to provide a lid body that is small in size and may prevent air leakage from the solenoid exhaust valve.

Another object of the present invention is to provide a pressure cooker having the above-mentioned lid body.

To obtain the above objects, in a first aspect of the present invention, an embodiment provides a lid body for a pressure cooker. The lid body comprises a pot lid, an inner lid, a top lid and a solenoid exhaust valve, wherein the inner lid is mounted at the outer side of the pot lid, the top lid is mounted at the outer side of the inner lid, and the solenoid exhaust valve comprises a valve seat, a valve core and a valve cover; a mounting cavity is provided on the top lid, the top and bottom of the mounting cavity are each provided with an opening, the valve seat is mounted in the mounting cavity, the valve seat has a mounting hole, the valve core is inserted in the mounting hole and the two ends of the valve core extend out of the mounting hole, the upper end of the valve core abuts against the upper end face of the valve seat, the top of the valve core is matingly connected to the valve cover, and the valve cover is movable with respect to the valve core to open or close the solenoid exhaust valve; wherein the bottom end of the valve core passes through the opening at the bottom of the mounting cavity and is fixedly connected to the pot lid, a limiting rib protruding inward is provided on the side wall of the mounting cavity, the bottom end of the valve seat abuts against the upper end face of the limiting rib, and the lower end face of the limiting rib abuts against the pot lid or the inner lid.

The present technical solution changed mounting of the valve seat. Specifically, a mounting cavity is arranged on the top lid, the valve seat is mounted in the mounting cavity, and the bottom end of the valve cover may be inserted into the mounting cavity through the top opening of the mounting cavity. Thus, the portion of the top lid between the valve seat and the valve cover is eliminated, and thereby the problem of deformation at the contact position between the top lid and the valve core in the related art is eliminated, the problem of air leakage from the solenoid exhaust valve incurred by deformation of the top lid is avoided, and thereby the reliability of exhaustion and the quality of the product is improved. On that basis, in the present technical solution, a limiting rib is arranged in the mounting cavity, and the bottom end of the valve seat contacts with the limiting rib, so as to obtain an effect of tensioning up the top lid by means of the valve seat, and thereby the clearance between the top lid and the pot lid is reduced, and finally the fit clearance between the top lid and the pot lid complies with the design standard.

In addition, since the valve seat always tension the limiting rib downwards, the limiting rib may deform after a time period if the bottom of the limiting rib is suspended; consequently, the valve seat may become lowered or inclined, resulting in air leakage at the solenoid exhaust valve. To avoid that problem, in the present technical solution, the lower end face of the limiting rib is configured to abut against the pot lid or inner lid, so that the limiting rib is supported and the above problem is avoided.

In any of the above technical solutions, preferably, at least one limiting rib is arranged on each of the two opposing inner sides of the mounting cavity respectively, a slotted hole is formed between the limiting ribs on the two inner sides of the mounting cavity, the radial dimension of the valve seat is greater than the axial dimension of the valve seat, the length of the slotted hole is greater than or equal to the radial dimension of the valve seat, and the width of the slotted hole is greater than or equal to the axial dimension of the valve seat and smaller than the radial dimension of the valve seat, so that the valve seat may pass through the slotted hole from the bottom of the top lid and enter the mounting cavity.

In any of the above technical solutions, preferably, a circuit board is mounted on the inner lid, a coil and an electric wire are arranged in the valve seat, the electric wire is connected to the coil, one end of the electric wire is positioned outside the casing of the valve seat, and the end of the electric wire positioned outside the casing of the valve seat is connected to the circuit board.

Since the valve seat is connected to the circuit board mounted on the top lid through wire, the valve seat needs to be mounted into the mounting cavity from the bottom of the top lid. To that end, in the present technical solution, a slotted hole for mounting the valve seat is formed between the limiting ribs, the length of the slotted hole is greater than or equal to the radial dimension of the valve seat, the width of the slotted hole is greater than or equal to the axial dimension of the valve seat and smaller than the radial dimension of the valve seat. To mount the valve seat, the valve seat is first placed laterally so that the side wall of the valve seat is aligned with the slotted hole; then the valve seat is inserted through the slotted hole upwardly into the mounting cavity; next the valve seat is turned so that the bottom end of the valve seat faces the slotted hole and the position of the valve seat may be retained by the limiting rib, and hence the valve seat is fixed in the mounting cavity.

In any of the above technical solutions, preferably, the inner lid has a supporting member arranged in a manner that the supporting member is staggered from the limiting rib on the pot lid, one part of the bottom end of the valve seat abuts against the limiting rib, another part of the bottom end of the valve seat abuts against the upper end face of the supporting member, and the lower end face of the supporting member is supported on the pot lid.

After the valve seat is mounted in position, one part of the bottom end of the valve seat abuts against the limiting rib on the top lid, and another part of the bottom end of the valve seat abuts against the upper end face of the supporting member of the inner lid, so that the valve seat tensions up the inner lid and the top lid, and thereby the inner lid and the top lid are secured to the pot lid.

In any of the above technical solutions, preferably, the bottom of the mounting cavity has a slotted hole through which the valve seat may be inserted from the bottom of the top lid into the mounting cavity, the supporting member has a clearance hole, the bottom end of the valve core passes through the clearance hole and is fixedly connected to the pot lid, and the supporting member is accommodated in the slotted hole.

In any of the above technical schemes, preferably, a sealing member is arranged between the valve seat and the top lid to for sealing.

In the present technical solution, a sealing member is arranged between the valve seat and the top lid to seal the clearance between the valve seat and the top lid and prevent air leakage through the clearance. Specifically, the sealing member comprises a seal ring.

In any of the above technical solutions, preferably, the sealing member is fitted over the valve seat, and the clearance between the valve seat and the side wall of the mounting cavity is sealed by the sealing member, so that sealing is formed between the valve seat and the top lid.

In the technical solution, a sealing member is fitted over the valve seat, the inner side of the sealing member presses and interferes with the valve seat, the outer side of the sealing member presses and interfere with the side wall of the mounting cavity, and thereby the clearance between the valve seat and the side wall of the mounting cavity is sealed to prevent air leakage through the clearance between the valve seat and the side wall of the mounting cavity. Moreover, the sealing member may improve the mounting stability of the valve seat and prevent the valve seat from swaying in the mounting cavity.

In any of the above technical solutions, preferably, a limiting boss protruding radially is arranged on the upper end of the valve core, and the limiting boss abuts against the upper end face of the valve seat.

In the present technical solution, a limiting boss is arranged on the valve core, and the limiting boss presses against the valve seat. In such a design, the assembling structure of the valve seat and the valve core is simple, and the assembling efficiency of the product may be improved.

In any of the above technical solutions, preferably, a connecting hole for mounting the valve core is arranged in the pot lid, and the bottom end of the valve core passes through the connecting hole and is fixedly connected to the pot lid by means of a fastener.

In any of the above technical solutions, preferably, the bottom end of the valve core has male threads, the fastener is a nut, and the bottom end of the valve core is fixed to the pot lid by means of the nut.

In any of the above technical solutions, preferably, an avoidance hole is formed in limiting rib or between the limiting ribs, and a snap is arranged on the inner lid, the snap passes through the avoidance hole.

In any of the above technical solutions, preferably, an annular convex rib is arranged on the upper end of the valve seat, and the valve seat may be temporarily fixed to the inner lid by means of the snap-fitting between the annular convex rib and the snap before the top lid is mounted.

In the assembling process of the lid body, the valve seat has to be fixed to the inner lid in advance, then some other assembling procedures should be completed; after that, the valve seat can be removed from the position where it is fixed in advance and then assembled to the final assembling position; in addition, after the valve seat is preassembled to the inner lid, sometimes the inner lid should be turned over to carry out the follow-up assembling procedures. To that end, in the present technical solution, a snap-fitting structure is arranged for the inner lid and the valve seat. When the solenoid valve seat is mounted to the inner lid, the snap on the inner lid is snap-fitted to the annular convex rib on the valve seat, so that the solenoid valve seat is fixed effectively and will not drop off when the inner lid is turned over, and thereby the wire connected to the solenoid valve seat can be prevented from getting loose or broken. Besides, an avoidance hole is arranged on the limiting rib of the top lid at a position corresponding to the snap of the inner lid; thus, the snap may pass through the avoidance hole, and ensure the limiting rib of the top lid does not interfere with the snap of the inner lid.

In the overturn process of the inner lid, the solenoid valve seat may drop off; as a result, the wire connected to the solenoid valve seat may get loose or may be broken, and the quality of the product is compromised.

In any of the above technical solutions, preferably, the bottom end face of the valve cover faces the upper end face of the valve seat when the solenoid exhaust valve is closed.

In any of the above technical schemes, preferably the bottom end of the valve cover extends into the top opening of the mounting cavity when the exhaust valve is closed.

Such a design eliminates the portion of the top lid between the valve seat and the valve cover, shortens the distance between the valve cover and the valve seat, improves the valve cover attraction and repulsion effect of the magnetic field generated in the solenoid coil in the valve seat to the valve cover, and thereby the number of windings of the coil may be decreased appropriately so as to reduce the dimensions of the valve seat and reduce the overall dimensions of the product, improve the esthetic appearance of the product, and enhance the competitiveness of the product.

In a second aspect of the present invention, an embodiment provides a pressure cooker, which comprises the lid body provided in any embodiment of the present invention and a cooker body used with the lid body.

Since the pressure cooker provided in the embodiment in the second aspect of the present invention has the lid body provided in any embodiment in the first aspect of the present invention, the pressure cooker has all beneficial effects of the lid body provided in any of the above embodiments, and the beneficial effects are not repeated here. Specifically, the pressure cooker comprises an electric pressure cooker or electric pressure rice cooker, etc.

Specifically, the pressure cooker is an electric pressure cooker or electric pressure rice cooker.

Additional aspects and advantages of the present invention will become obvious in the following description or may be understood in the practice of the present invention.

BRIEF DESCRIPTION OF DRAWINGS

The above-mentioned and/or additional aspects and advantages of the present invention will become more apparent and can be understood more easily in the description of embodiments with reference to the accompanying drawings. Among the drawings.

Figure 1:
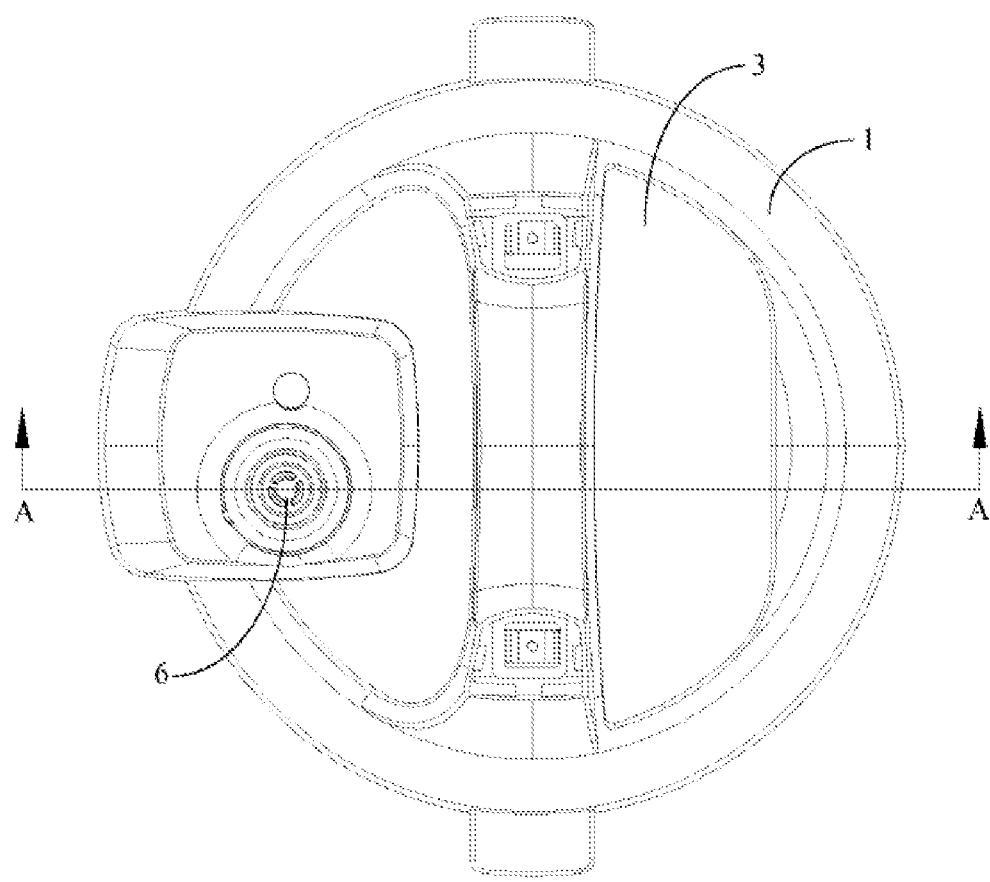
FIG. 1 is a top view of the lid body provided in an embodiment of the present invention.

Wherein, the corresponding relationship between the reference numbers and the names of the parts and components in FIGS. 1-11 are as follows:

1—pot lid; 2—inner lid, 21—supporting member, 211—clearance hole, 3—top lid, 31—mounting cavity, 311—limiting rib, 3111—avoidance hole, 312—slotted hole, 4—valve seat, 41—annular rib; 5—valve core, 51—limiting boss; 6—valve cover; 7—sealing member; 8—nut.

DETAILED DESCRIPTION OF THE EMBODIMENTS

To make the above-mentioned object, features and advantages of the present invention understood more clearly, hereunder the present invention will be further described in detail in connection with drawings and embodiments. It should be noted that the embodiments and the features in the embodiments of the present application may be combined with each other, if there is no conflict among them.

Although many details are described in the following to facilitate fully understanding the present invention, the present invention may be implemented in other manners besides the manner described here. Therefore, the scope of protection of the present invention is not limited to the specific embodiments disclosed hereunder.

As shown in FIGS. 1-11, in the first aspect of the present invention, an embodiment provides a lid body for a pressure cooker. The lid body comprises a pot lid 1, an inner lid 2, a top lid 3 and a solenoid exhaust valve, wherein the inner lid 2 is mounted at the outer side of the pot lid 1, the top lid 3 is mounted at the outer side of the inner lid 2, and the solenoid exhaust valve comprises a valve seat 4, a valve core 5 and a valve cover 6. A mounting cavity 31 is provided on the top lid 3. The top and bottom of the mounting cavity 31 are each provided with an opening. The valve seat 4 is mounted in the mounting cavity 31, and the valve seat 4 has a mounting hole 40. The valve core 5 is inserted in the mounting hole 40 and the two ends of the valve core 40 extend out of the mounting hole 40. The upper end of the valve core 5 abuts against the upper end face of the valve seat 4, the top of the valve core 5 is fitted to the valve cover 6, and the valve cover 6 is movable with respect to the valve core 5 so as to open or close the solenoid exhaust valve. The bottom end of the valve core 5 passes through the opening at the bottom of the mounting cavity 31 and is fixedly connected to the pot lid 1. A limiting rib 311 protruding inward is provided on the side wall of the mounting cavity 31. The bottom end of the valve seat 4 abuts against the upper end face of the limiting rib 311, and the lower end face of the limiting rib 311 abuts against the pot lid 1 or the inner lid 2.

The present technical solution changes the mounting of the valve seat 4. A mounting cavity 31 is arranged on the top lid 3, the valve seat 4 is mounted in the mounting cavity 31, and the bottom end of the valve cover 6 may enter the mounting cavity 31 through the top opening of the mounting cavity 31. Thus, the portion of the top lid 3 between the valve seat 4 and the valve cover 6 is eliminated, and thereby the problem of deformation at the contact position between the top lid 3 and the valve core 5 in the related art is eliminated, the problem of air leakage from the solenoid exhaust valve caused by deformation of the top lid 3 is avoided, and the reliability of exhaustion and the quality of the product is improved. On that basis, in present technical solution, a limiting rib 311 is arranged in the mounting cavity 31, and the bottom end of the valve seat 4 contacts the limiting rib 311, so as to obtain an effect of tensioning up the top lid 3 by means of the valve seat 4, thereby reducing the clearance between the top lid 3 and the pot lid 1, and finally the fit clearance between the top lid 3 and the pot lid 1 complies with the design standard.

In addition, since the valve seat 4 always tensions the limiting rib 311 downwardly, the limiting rib 311 may deform after a time period if the bottom of the limiting rib 311 is suspended. Consequently, the valve seat 4 may become lowered or inclined, resulting in air leakage at the solenoid exhaust valve. To avoid that problem, in present technical solution, the lower end face of the limiting rib 311 is configured to abut against the pot lid 1 or inner lid 2, so that the limiting rib 311 is supported and the above problem is avoided.

Figure 4:
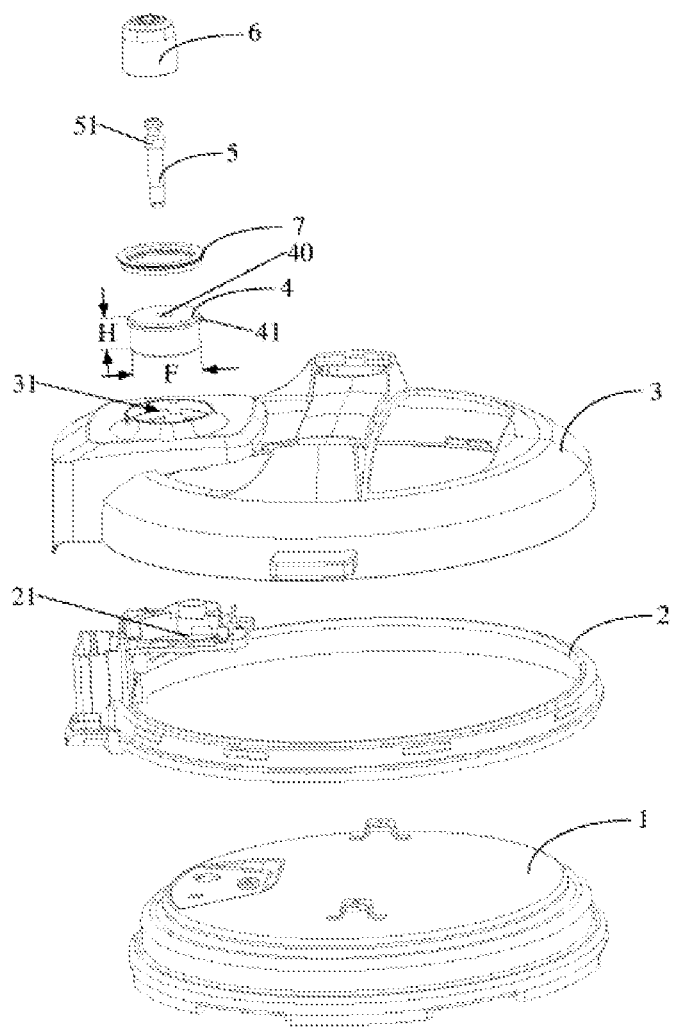
FIG. 4 is an exploded view of the lid body shown in FIG. 1.
Figure 5:
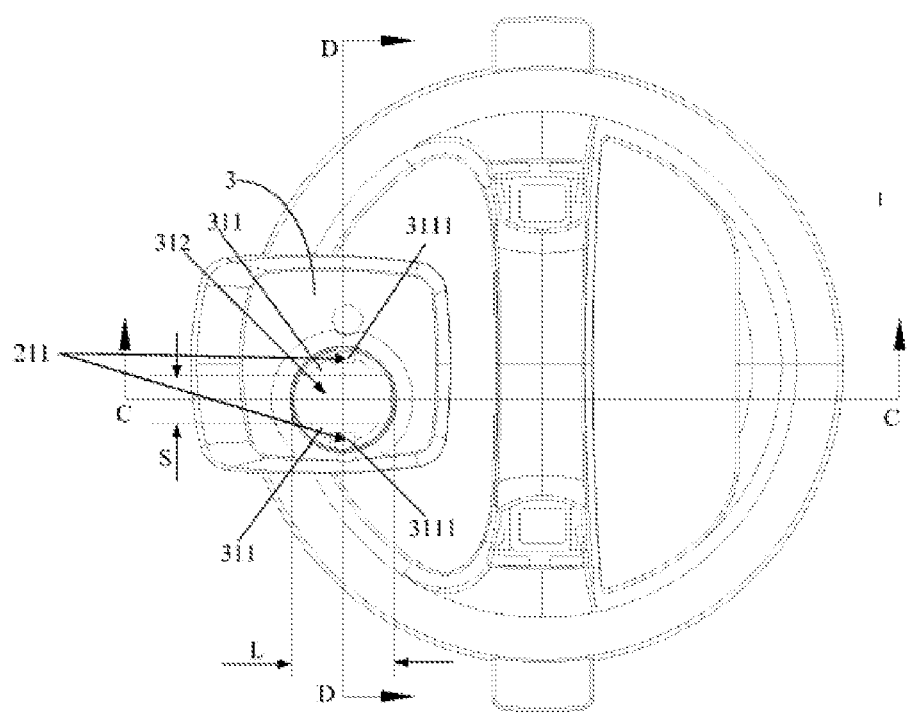
FIG. 5 is a top view of the top lid shown in FIG. 4.
Figure 6:
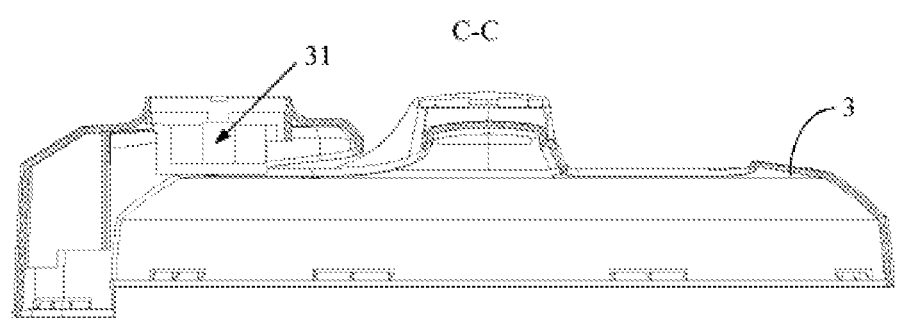
FIG. 6 is a sectional view taken in C-C direction of the top lid shown in FIG. 5.
Figure 7:
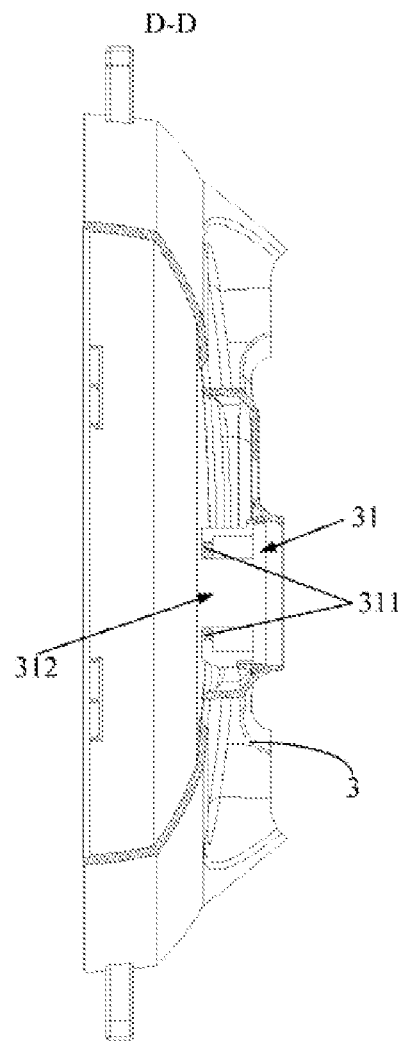
FIG. 7 is a sectional view taken in D-D direction of the top lid in shown FIG. 5.

As shown in FIGS. 4 and 5, in any of the above technical solutions, preferably, at least one limiting rib 311 is arranged on each of the two opposing inner sides of the mounting cavity 31, and a slotted hole 312 is formed between the limiting ribs 311 on the two inner sides of the mounting cavity 31. The radial dimension F of the valve seat 4 is greater than the axial dimension H of the valve seat 4, the length L of the slotted hole 312 is greater than or equal to the radial dimension F of the valve seat 4, and the width S of the slotted hole 312 is greater than or equal to the axial dimension H of the valve seat 4 and smaller than the radial dimension F of the valve seat 4, so that the valve seat 4 may pass through the slotted hole 312 from the bottom of the top lid 3 and enter the mounting cavity 31.

In any of the above technical solutions, preferably, a circuit board is mounted on the inner lid 2, and a coil and an electric wire are arranged in the valve seat 4. The electric wire is connected to the coil. One end of the electric wire is positioned outside the casing of the valve seat 4, and the end of the electric wire positioned outside the casing of the valve seat 4 is connected to the circuit board.

Figure 10:
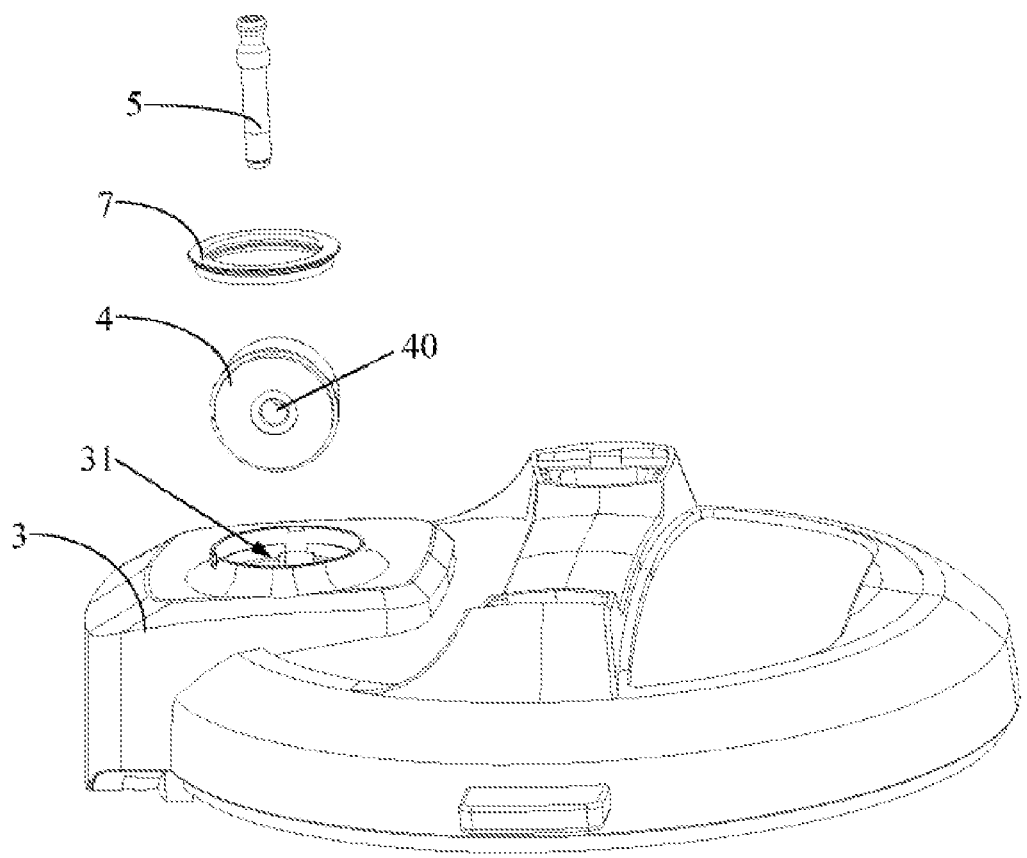
FIG. 10 is a schematic diagram of the assembling process of the valve seat shown in FIG. 4.
Figure 11:
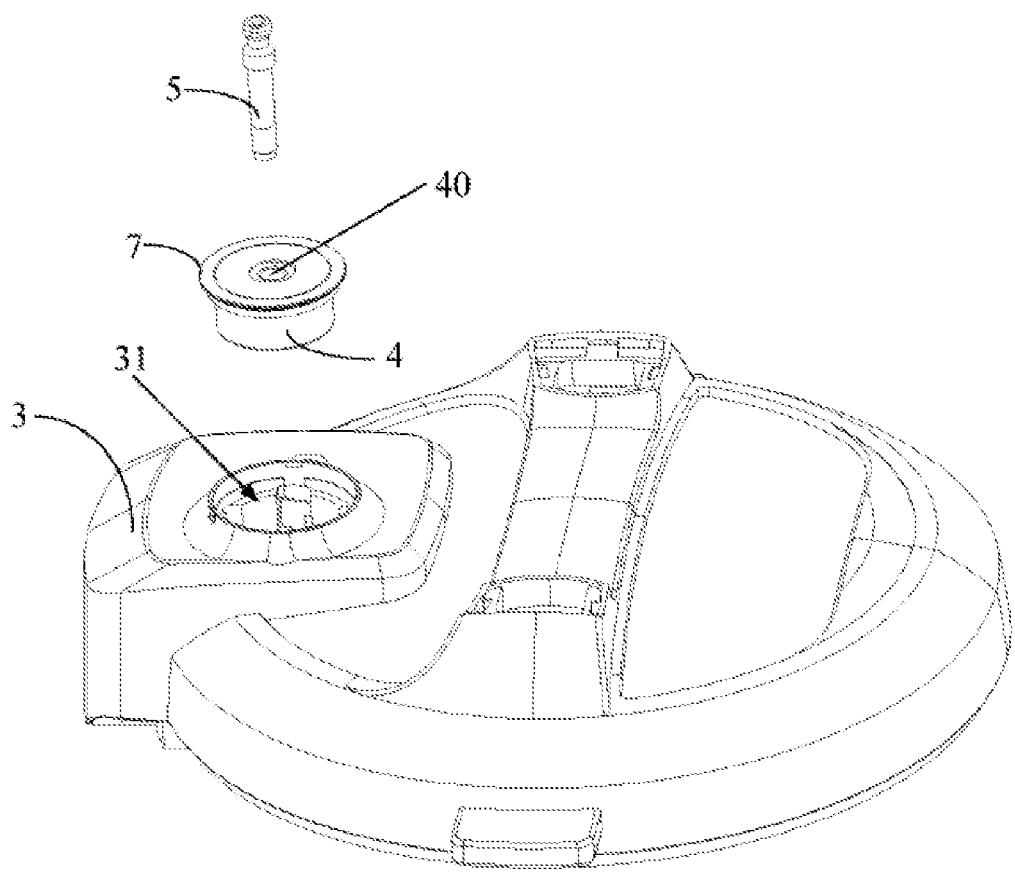
FIG. 11 is a schematic diagram of the assembling process of the valve seat shown in FIG. 4.

Since the valve seat 4 is connected to the circuit board mounted on the top lid 3 through wires, the valve seat 4 needs to be mounted into the mounting cavity 31 from the bottom of the top lid 3. To that end, in the present technical solution, the slotted hole 312 for mounting the valve seat 4 is formed between the limiting ribs 311, the length of the slotted hole 312 is greater than or equal to the radial dimension of the valve seat 4, the width of the slotted hole 312 is greater than or equal to the axial dimension of the valve seat 4 and smaller than the radial dimension of the valve seat 4. To mount the valve seat 4, as shown in FIGS. 10 and 11, the valve seat 4 is first placed laterally so that the side wall of the valve seat 4 is aligned with the slotted hole 312. Then the valve seat 4 is inserted through the slotted hole 312 upwardly to enter the mounting cavity 31. Next, the valve seat 4 is turned so that the bottom end of the valve seat 4 faces the slotted hole 312 and the position of the valve seat 4 can be retained by the limiting ribs 311 and hence the valve seat 4 is fixed in the mounting cavity 31.

Figure 8:
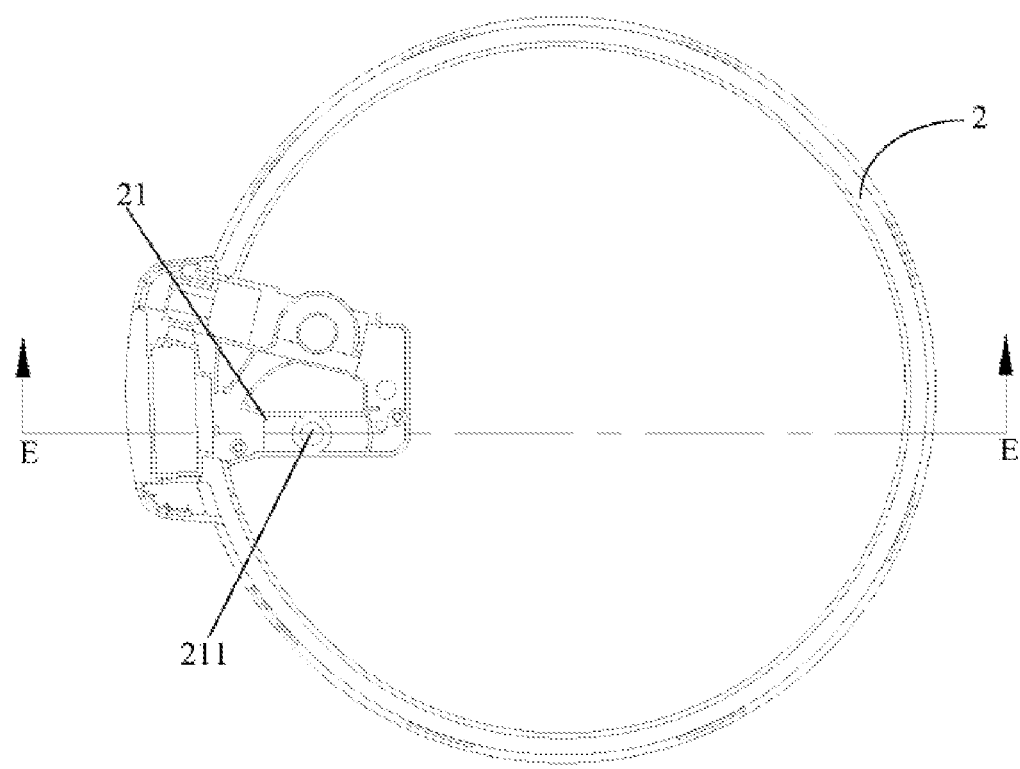
FIG. 8 is a top view of the inner lid shown in FIG. 4.
Figure 9:
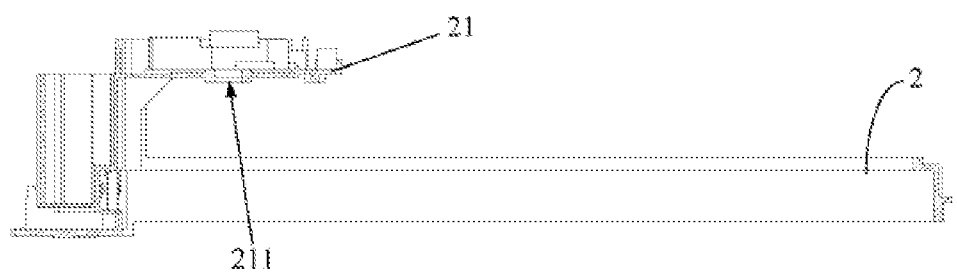
FIG. 9 is a sectional view taken in E-E direction of the inner lid shown in FIG. 8.

As shown in FIGS. 8 and 9, in any of the above technical solutions, preferably, the inner lid 2 is provided with a supporting member 21 arranged on the pot lid 1 in a manner that the supporting member 21 is staggered from the limiting rib 311. A part of the bottom end of the valve seat 4 abuts against the limiting rib 311, and another part of the bottom end of the valve seat 4 abuts against the upper end face of the supporting member 21. The lower end face of the supporting member 21 is supported on the pot lid 1.

After the valve seat 4 is mounted in position, a part of the bottom end of the valve seat 4 abuts against the limiting ribs 311 on the top lid 3, and another part of the bottom end of the valve seat 4 abuts against the upper end face of the supporting member 21 of the inner lid 2, so that the valve seat 4 tensions up the inner lid 2 and the top lid 3, and thereby the inner lid 2 and the top lid 3 are secured to the pot lid 1.

In any of the above technical solutions, preferably, the bottom of the mounting cavity 31 has a slotted hole 312 through which the valve seat 4 may be inserted from the bottom of the top lid 3 into the mounting cavity 31. The supporting member 21 has a clearance hole 211. The bottom end of the valve core 5 passes through the clearance hole 211 and is fixedly connected to the pot lid 1. The supporting member 21 is accommodated in the slotted hole 312.

Figure 2:
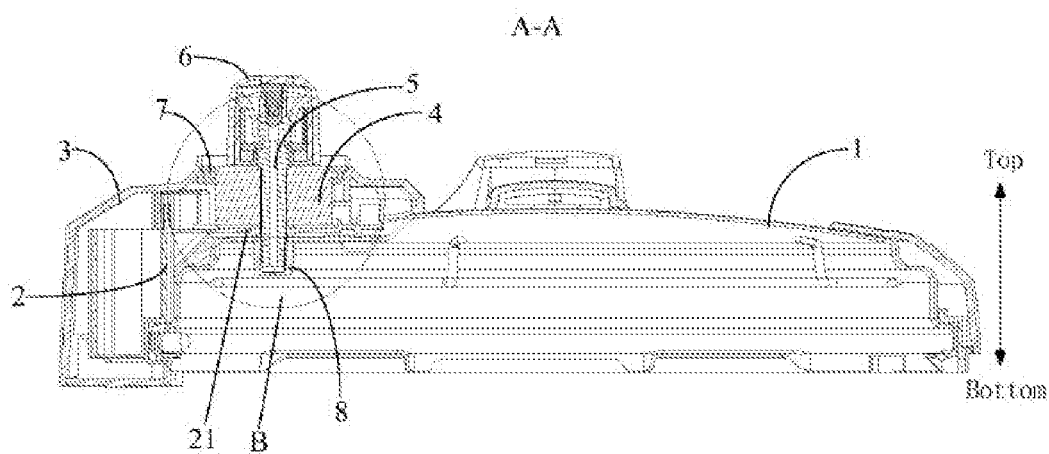
FIG. 2 is a sectional view taken in A-A direction of the lid body shown in FIG. 1.
Figure 3:
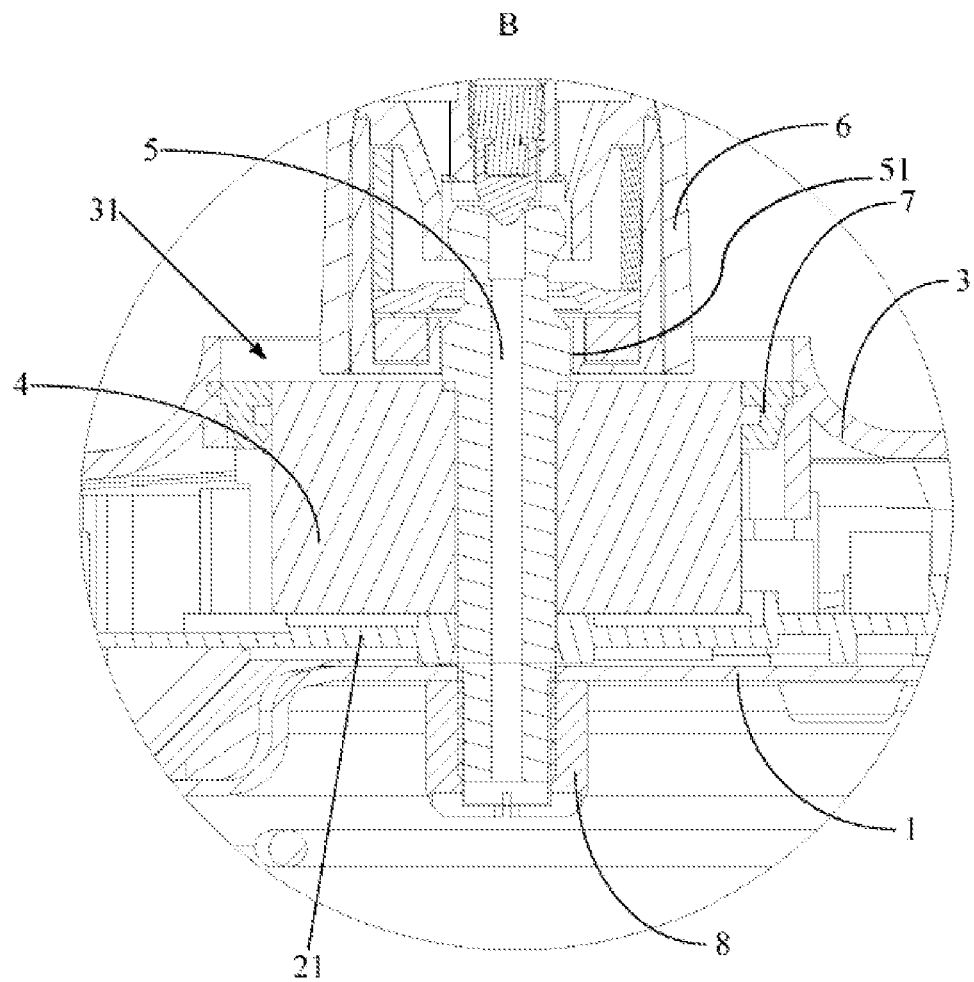
FIG. 3 is an enlarged view of the portion B in FIG. 2.

As shown in FIGS. 2-4, in any of the above technical solutions, preferably, a sealing member 7 is arranged between the valve seat 4 and the top lid 3 for sealing.

With the technical solution, a sealing member 7 is arranged between the valve seat 4 and the top lid 3 to seal the clearance between the valve seat 4 and the top lid 3, so as to prevent air leakage through the clearance. Specifically, the sealing member 7 comprises a seal ring.

In any of the above technical solutions, preferably, the sealing member 7 is fitted over the valve seat 4, and the clearance between the valve seat 4 and the side wall of the mounting cavity 31 is sealed by the sealing member 7, so that sealing is formed between the valve seat 4 and the top lid 3.

In the present technical solution, a sealing member 7 is fitted over the valve seat 4. The inner side of the sealing member 7 presses and interferes with the valve seat 4, and the outer side of the sealing member 7 presses and interferes with the side wall of the mounting cavity 31, thereby sealing the clearance between the valve seat 4 and the side wall of the mounting cavity 31 to prevent air leakage through the clearance between the valve seat 4 and the side wall of the mounting cavity 31. Moreover, the sealing member 7 may improve the mounting stability of the valve seat 4 and prevent the valve seat 4 from swaying in the mounting cavity 31.

As shown in FIGS. 2-4, in any of the above technical solutions, preferably, a limiting boss 51 protruding radially is arranged on the upper end of the valve core 5, and the limiting boss 51 abuts against the upper end face of the valve seat 4.

In the present technical solution, a limiting boss 51 is arranged on the valve core 5, and the limiting boss 51 presses against the valve seat 4. In such a design, the assembling structure of the valve seat 4 and the valve core 5 is simple, and the assembling efficiency of the product can be improved.

In any of the above technical solutions, preferably, a connecting hole for mounting the valve core 5 is arranged in the pot lid 1, and the bottom end of the valve core 5 passes through the connecting hole and is fixedly connected to the pot lid 1 by means of a fastener.

In any of the above technical solutions, preferably, the bottom end of the valve core 5 has male threads, the fastener is a nut 8, and the bottom end of the valve core 5 is fixed to the pot lid 1 by means of the nut 8.

Specifically, the assembling process of the valve core 5 and the valve seat 4 is as follows. The valve seat 4 is placed laterally first, so that the side wall of the valve seat 4 is aligned with the slotted hole 312 at the bottom end of the mounting cavity 31. Then the valve seat 4 is inserted through the slotted hole 312. In order to mount the sealing member 7 to the mounting cavity 31 conveniently, the top of the mounting cavity 31 is usually designed in an open form. The valve seat 4 inserted through the slotted hole 312 extends out of the top end of the mounting cavity 31, then the sealing member 7 is fitted over the valve seat 4. Next, the valve seat 4 is vertically mounted from the top end of the mounting cavity 31 into the mounting cavity 31. Specifically, the valve seat 4 may be vertically mounted into the mounting cavity 31 before the sealing member 7 is mounted, and the valve seat 4 is retained in position by the limiting ribs 311. Then the bottom end of the valve core 5 is inserted through the top opening of the mounting cavity 31, the mounting hole 40 of the valve seat 4, the clearance hole 211 of the supporting member 21 of the inner lid 2, and the connecting hole of the pot lid 1 sequentially, until the limiting boss 51 of the valve core 5 comes into contact with the top end of the valve seat 4. Finally, the valve core 5 is tightened up by means of the nut 8, so that the valve core 5 tensions up the valve seat 4, and thereby the valve seat 4 tensions up the top lid 3.

As shown in FIG. 5, in any of the above technical solutions, preferably, an avoidance hole 3111 is formed at the limiting rib 311 or between the limiting ribs 311, and a snap is arranged on the inner lid 2 and passes through the avoidance hole 3111.

As shown in FIG. 4, in any of the above technical solutions, preferably, an annular convex rib is arranged on the upper end of the valve seat 4, and the valve seat 4 may be temporarily fixed to the inner lid 2 by means of the snap-fitting between the annular convex rib 41 and the snap before the top lid 3 is mounted.

In the assembling process of the lid body, the valve seat 4 should be fixed to the inner lid 2 in advance, then some other assembling procedures may be completed. After that, the valve seat 4 can be removed from the position where it is fixed in advance and then assembled to the final assembling position. In addition, after the valve seat 4 is preassembled to the inner lid 2, sometimes the inner lid 2 should be turned over to carry out the follow-up assembling procedures. To that end, in the present technical solution, a snap-fitting structure is arranged for the inner lid 2 and the valve seat 4. When the solenoid valve seat 4 is mounted to the inner lid 2, the snap on the inner lid 2 is snap-fitted to the annular convex rib 41 on the valve seat 4, so that the solenoid valve seat 4 is fixed effectively and will not drop off when the inner lid 2 is turned over, and thereby the lead wires connected to the solenoid valve seat 4 can be prevented from getting loose or broken. Besides, the limiting rib 311 of the top lid 3 is provided with an avoidance hole 3111 at a position corresponding to the snap of the inner lid 2. The snap may pass through the avoidance hole 3111, such that the limiting rib 311 of the top lid 3 does not interfere with the snap of the inner lid 2.

In the overturn process of the inner lid 2, the solenoid valve seat 4 may drop off. As a result, the lead wires connected to the solenoid valve seat 4 may get loose or may be broken, and the quality of the product is compromised.

In any of the above technical solutions, preferably, the bottom end face of the valve cover 6 faces the upper end face of the valve seat 4 when the solenoid exhaust valve is closed.

In any of the above technical solutions, preferably, the bottom end of the valve cover 6 extends into the top opening of the mounting cavity 31 when the exhaust valve is closed.

Such a design eliminates the portion of the top lid 3 between the valve seat 4 and the valve cover 6, shortens the distance between the valve cover 6 and the valve seat 4, improves the attraction and repulsion effect of the magnetic field generated in the solenoid coil in the valve seat 4 to the valve cover 6, and thereby the number of windings of the coil may be decreased appropriately so as to reduce the dimensions of the valve seat 4 and reduce the overall dimensions of the product, improve the esthetic appearance of the product, and enhance the competitiveness of the product.

In a second aspect of the present invention, an embodiment provides a pressure cooker, which comprises the lid body provided in any embodiment of the present invention and a cooker body used with the lid body.

Since the pressure cooker provided in the embodiment in the second aspect of the present invention has the lid body provided in any embodiment in the first aspect of the present invention, the pressure cooker has all beneficial effects of the lid body provided in any of the above embodiments, and the beneficial effects are not repeated here. Specifically, the pressure cooker comprises an electric pressure cooker or an electric pressure rice cooker, etc.

Specifically, the pressure cooker comprises an electric pressure cooker or an electric pressure rice cooker, etc.

In the description of the present invention, the orientation or position relations indicated by terms "above", "below", "top", and "bottom", etc., are based on the orientation or position relations indicated on the accompanying drawings. They are used only to ease and simplify the description of the present invention, instead of indicating or implying that the involved device or component must have a specific orientation or must be constructed and operated in a specific orientation. Therefore, the use of these terms shall not be deemed as constituting any limitation to the present invention.

In the description of the present invention, the expressions of reference terms "an embodiment", "some embodiments", and "specific embodiment", etc. mean that the specific features, structures, materials or characteristics described in those embodiments or examples are included in at least one embodiment or example of the present invention. In this document, the exemplary expression of the above terms may not necessarily refer to the same embodiment or example. Moreover, the specific features, structures, materials, or characteristics described can be combined appropriately in any one or more embodiments or example. The terms "connect", "mount", and "fix", etc. shall be comprehended in their general meanings, for example, a connection may be a fixed connection, detachable connection, or integral connection; or may be a direct connection or indirect connection via an intermediate medium. Those having ordinary skills in the art may interpret the specific meanings of the terms in the present invention in their context.

While the present invention has been illustrated and described with reference to some preferred embodiments, the present invention is not limited to these. Those skilled in the art should recognize that various variations and modifications can be made, without departing from the spirit and scope of the present invention as defined by the accompanying claims. Any modification, equivalent replacement, or refinement made to the embodiments without departing from the spirit and the principle of the present invention shall be deemed as falling into the scope of protection of the present invention.

The invention claimed is:

1. A lid body for a pressure cooker, comprising:
 a pot lid including:
  a mounting cavity; and
  a limiting rib protruding inward from a side wall of the mounting cavity;
 an inner lid mounted at an outer side of the pot lid;
 a top lid mounted at an outer side of the inner lid; and
 a solenoid exhaust valve including:
  a valve seat mounted in the mounting cavity and including a mounting hole;
  a valve core inserted in the mounting hole; and
  a valve cover matingly connected with a top of the valve core and being movable with respect to the valve core;
 wherein a bottom end of the valve seat abuts against an upper end face of the limiting rib, and a lower end face of the limiting rib abuts against the pot lid or the inner lid.

2. The lid body of claim 1, wherein:
 a top and a bottom of the mounting cavity are each provided with an opening; and
 a bottom end of the valve core passes through the opening at the bottom of the mounting cavity and is fixedly connected with the pot lid.

3. The lid body of claim 2, wherein
 the pot lid includes a connecting hole; and
 the bottom end of the valve core passes through the connecting hole and is fixedly connected with the pot lid via a fastener.

4. The lid body of claim 1, wherein:
 two ends of the valve core, including an upper end, extend out of the mounting hole of the valve seat; and the upper end of the valve core abuts against an upper end face of the valve seat.

5. The lid body of claim 4, wherein the valve core includes a limiting boss protruding radially from the upper end of the valve core, and the limiting boss being configured to abut against the upper end face of the valve seat.

6. The lid body of claim 1, wherein:
the limiting rib is one of two limiting ribs protruding inward from two opposing inner sides of the mounting cavity, respectively, a slotted hole being formed between the two limiting ribs; and
a radial dimension of the valve seat is greater than an axial dimension of the valve seat, a length of the slotted hole is greater than or equal to the radial dimension of the valve seat, and a width of the slotted hole is greater than or equal to the axial dimension of the valve seat and smaller than the radial dimension of the valve seat.

7. The lid body of claim 1, further comprising:
a circuit board mounted at the inner lid; and
a coil and an electric wire arranged in the valve seat, the electric wire being connected to the coil;
wherein one end of the electric wire is positioned outside a casing of the valve seat and connected to the circuit board.

8. The lid body of claim 1, wherein:
the inner lid includes a supporting member staggered from the limiting rib;
one part of the bottom end of the valve seat abuts against the limiting rib and another part of the bottom end of the valve seat abuts against an upper end face of the supporting member; and
a lower end face of the supporting member is supported on the pot lid.

9. The lid body of claim 8, wherein:
a bottom of the mounting cavity includes a slotted hole;
the valve seat is configured to be inserted from a bottom of the top lid into the mounting cavity through the slotted hole;
the supporting member is accommodated in the slotted hole and includes a clearance hole; and
a bottom end of the valve core passes through the clearance hole and is fixedly connected with the pot lid.

10. The lid body of claim 1, further comprising:
a sealing member arranged between the valve seat and the top lid.

11. The lid body of claim 10, wherein the sealing member is fitted over the valve seat and seals a clearance between the valve seat and the side wall of the mounting cavity.

12. The lid body of claim 1, wherein:
an avoidance hole is formed in the limiting rib; and
the inner lid includes a snap configured to pass through the avoidance hole.

13. The lid body of claim 12, wherein;
the valve seat includes an annular convex rib arranged at an upper end of the valve seat; and
the valve seat is configured to be temporarily fixed to the inner lid by snap-fitting between the annular convex rib and the snap before the top lid is mounted.

14. The lid body of claim 1, wherein a bottom end face of the valve cover faces an upper end face of the valve seat when the solenoid exhaust valve is closed.

15. The lid body of claim 1, wherein a bottom end of the valve cover extends into a top opening of the mounting cavity when the solenoid exhaust valve is closed.

16. A pressure cooker comprising:
a cooker body; and
a lid body coupled to the cooker body, the lid body including:
a pot lid including:
a mounting cavity; and
a limiting rib protruding inward from a side wall of the mounting cavity;
an inner lid mounted at an outer side of the pot lid;
a top lid mounted at an outer side of the inner lid; and
a solenoid exhaust valve including:
a valve seat mounted in the mounting cavity and including a mounting hole;
a valve core inserted in the mounting hole; and
a valve cover matingly connected with a top of the valve core and being movable with respect to the valve core;
wherein a bottom end of the valve seat abuts against an upper end face of the limiting rib, and a lower end face of the limiting rib abuts against the pot lid or the inner lid.

* * * * *